July 18, 1950 — L. E. SIMMONS — 2,515,805
REEL MECHANISM
Filed May 26, 1945 — 4 Sheets-Sheet 1

Inventor:
Leon E. Simmons.
by Louis A. Waxson.
Atty.

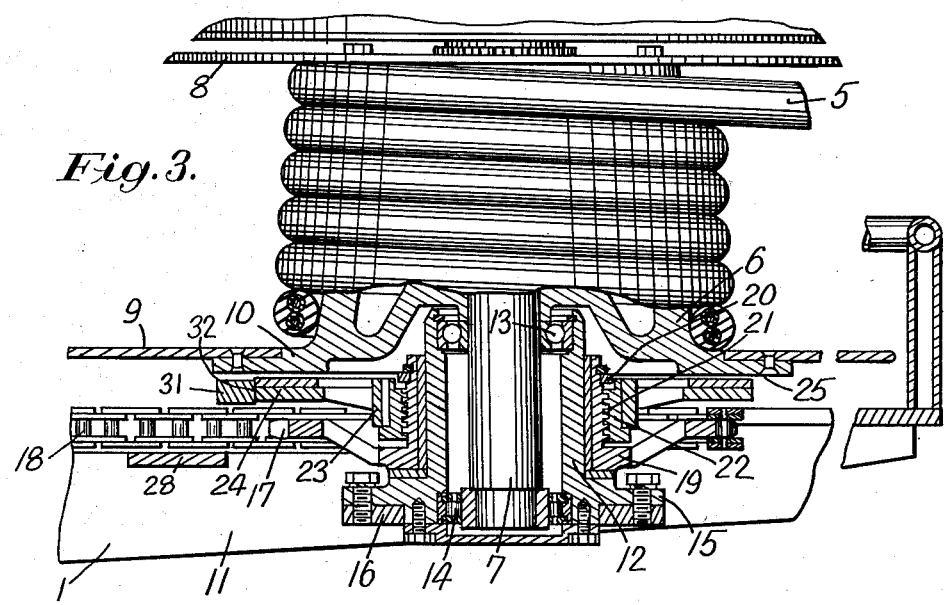
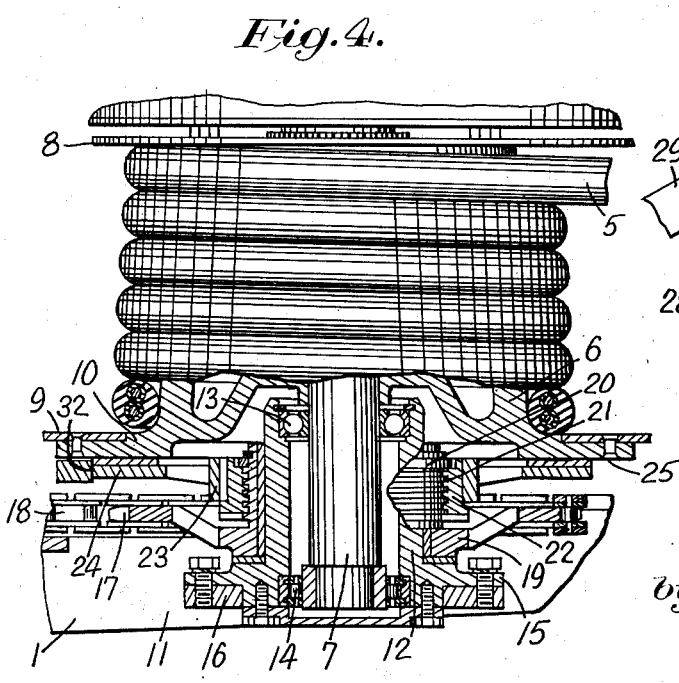
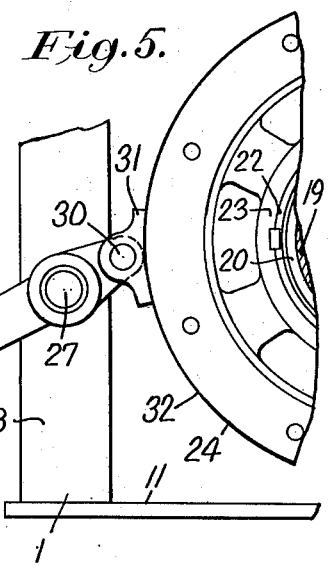

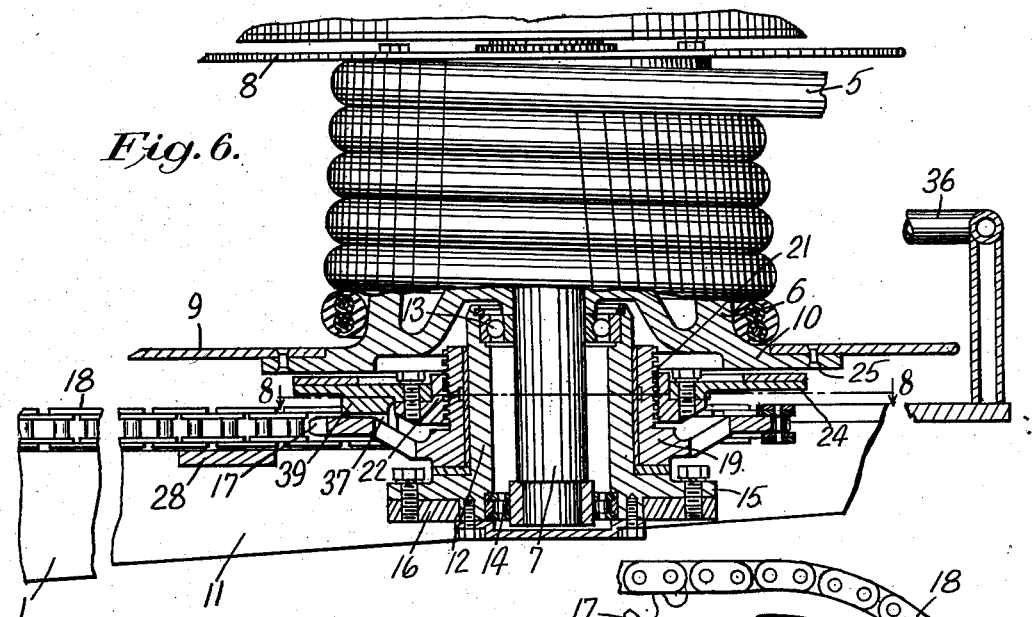
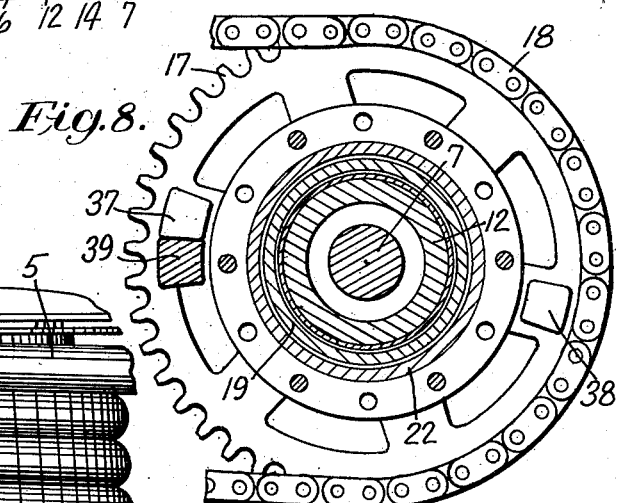
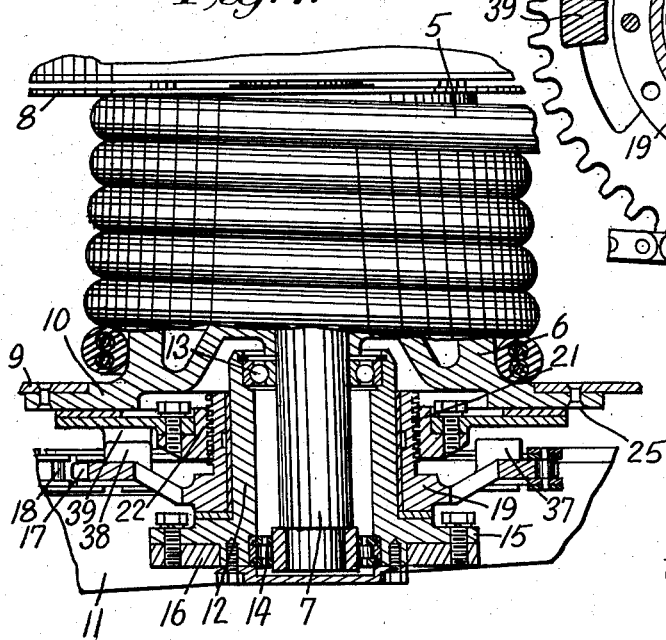

July 18, 1950  L. E. SIMMONS  2,515,805
REEL MECHANISM
Filed May 26, 1945  4 Sheets-Sheet 4
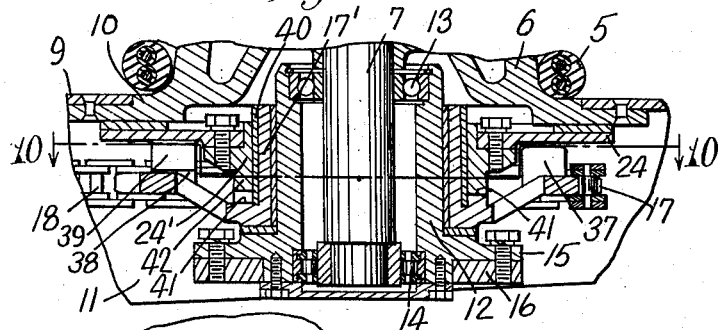
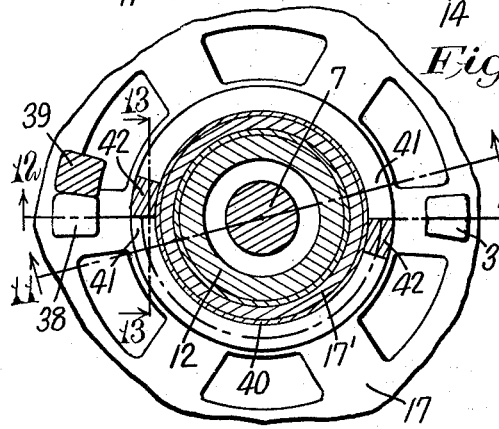
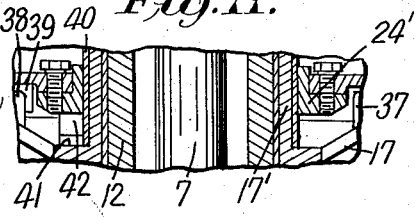
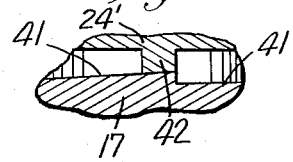
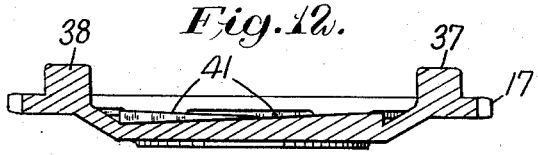
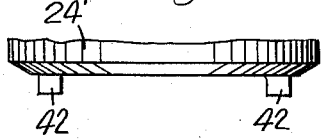
Inventor:
Leon E. Simmons.
by
Louis A. Maxson.
Atty Patented July 18, 1950

2,515,805

UNITED STATES PATENT OFFICE 2,515,805

REEL MECHANISM

Leon E. Simmons, Claremont, N. H., assignor to Joy Manufacturing Company, a corporation of Pennsylvania Application May 26, 1945, Serial No. 595,899

19 Claims. (Cl. 242—91)

This invention relates to the transmission of motive power to vehicles and more particularly to improvements in an electric cable reel for a flexible conductor cable for transmitting electricity to the electric motor devices of a vehicle.

In the transmission of motive power to the motor devices of a vehicle such as a vehicle for carrying a mining mechanism, a flexible power conductor element is usually wound on a winding reel carried by the vehicle and driven through power connections on the vehicle. In a vehicle of the character which carries a mining mechanism such as a coal cutter, as the vehicle travels in one direction, for instance as the vehicle turns off from the main entry in a mine into a mine passage leading to the working face, the cable reel may be disconnected from its drive and the cable freely unwound from the reel by the direct pull of the cable thereon. When the vehicle travels in the opposite direction, i. e. out of the mine passageway from the working face, the cable reel may be driven by power in cable winding direction. Also at times, it is desirable to unwind the cable from the reel freely by hand so that it is necessary for the reel to rotate quite freely when disconnected from its drive. From one aspect, the present invention resides in a winding or reeling mechanism having improved means for driving and controlling the reel. From another aspect, the present invention may reside in an improved means for the transmission of motive power to the motor devices of a vehicle. The driving and controlling means may embody an improved mechanism for automatically clutching the reel to its driving means upon drive in one direction and for automatically releasing the clutch to disconnect the reel from its driving means upon drive in the reverse direction. This driving and controlling mechanism may embody an inclined plane mechanism such as a screw and nut or cam mechanism for moving the clutch element into engagement with the reel and for slightly lifting the reel so that the weight of the reel maintains the clutch applied. Clutch release may be effected by lowering the reel onto a support and lowering the clutch still further, so as to remove the weight of the reel from the clutch, so that the reel, when the clutch is released, may rotate freely in unwinding direction. The power transmitting means may transmit any suitable form of power medium to the motor devices of the vehicle, and, in a preferred embodiment of the invention, the power transmitted is electricity and the cable reel is an electrical cable reel and has wound thereon an electric conductor cable for transmitting electricity to the electric motor devices of the vehicle.

An object of the present invention is to provide improved means for transmitting motive power medium to the motor devices of a vehicle. Another object is to provide an improved electric cable reel. A further object is to provide an improved cable reel having improved driving and controlling means. A still further object is to provide an improved mechanism for driving a cable reel in one direction and for automatically disconnecting the reel from its drive when reversal is effected. Yet another object is to provide an improved driving mechanism for a cable reel embodying means whereby the reel may be freely rotated by hand in cable unwinding direction. Still another object is to provide an improved clutch control mechanism for a cable reel embodying a screw and nut mechanism whereby when drive is effected in one direction, the clutch is automatically applied, and, when drive is effected in the reverse direction, the clutch is automatically released. These and other objects and advantages of the invention will, however, hereinafter more fully appear.

This application is a continuation-in-part of my copending application, Ser. No. 531,912, filed April 20, 1944, now Patent Number 2,450,257 of September 28, 1948.

In the accompanying drawings there are shown for purposes of illustration one form and two modifications which the invention may assume in practice.

In these drawings:

Fig. 3 is an enlarged view in longitudinal vertical section taken substantially on line 3—3 of Fig. 1, showing the cable reel in lowered position with the clutch released.

Fig. 4 is a fragmentary sectional view taken on the plane of Fig. 3, showing the cable reel in raised position with the clutch applied.

Fig. 5 is an enlarged detail horizontal view taken substantially on line 5—5 of Fig. 2.

Fig. 6 is a view similar to Fig. 3, illustrating a modified construction.

Fig. 7 is a view similar to Fig. 6, showing the cable reel in raised position with the clutch applied.

Fig. 8 is a horizontal sectional view taken substantially on line 8—8 of Fig. 6.

Fig. 9 is a sectional view similar to Fig. 7, illustrating another modification.

Fig. 10 is a horizontal sectional view taken substantially on line 10—10 of Fig. 9.

Fig. 11 is a detail vertical sectional view taken substantially on line 11—11 of Fig. 10.

Fig. 12 is a detail vertical sectional view taken substantially on line 12—12 of Fig. 10, with parts omitted to facilitate illustration.

Fig. 13 is a detail sectional view taken on line 13—13 of Fig. 10.

Fig. 14 is a fragmentary side elevational view showing the clutch plate hub.

Figure 1:
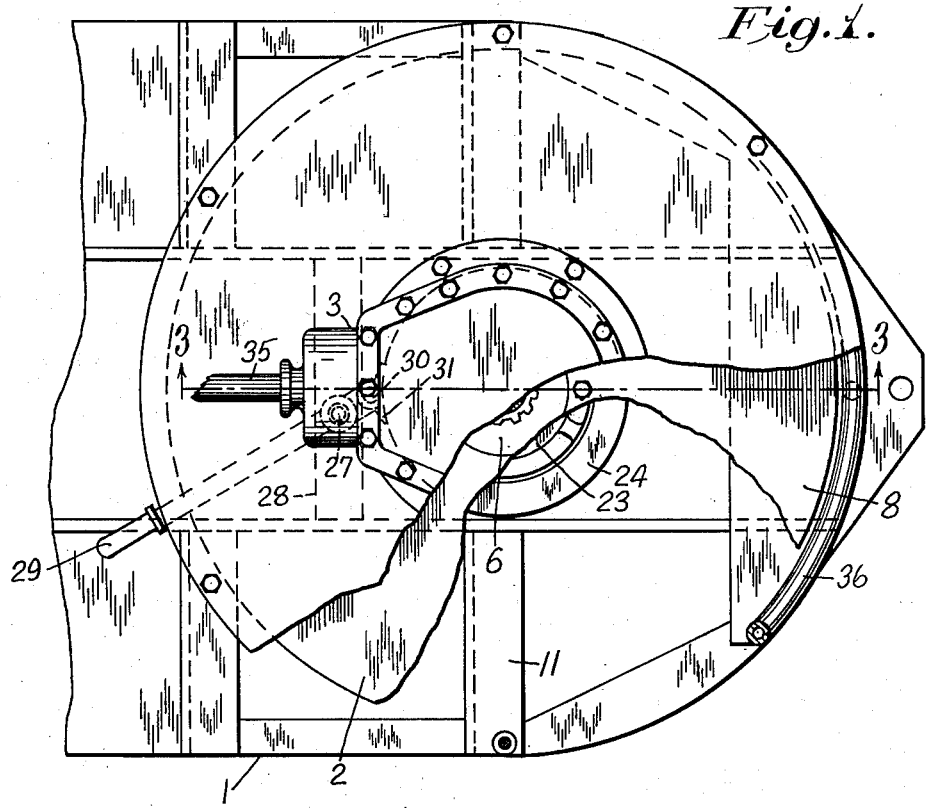
Fig. 1 is a fragmentary plan view, partially broken away to show structural details, of a cable reel constructed in accordance with an illustrative embodiment of the invention.
Figure 2:
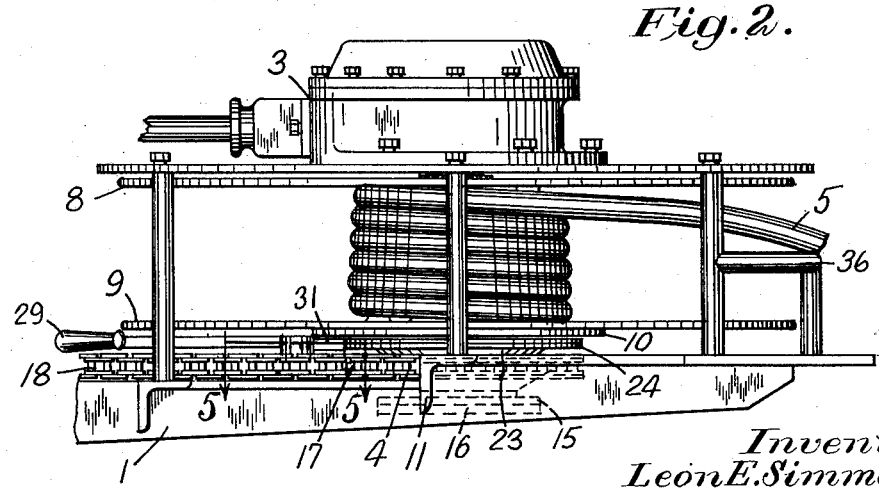
Fig. 2 is a side elevational view of the reel mechanism shown in Fig. 1.

In the illustrative embodiment of the invention shown in Figs. 1 to 5 inclusive, there is a support structure 1 on which a cable reel 2 is mounted, the latter having improved electrical connections 3 and improved driving mechanism 4. The support structure which may be associated with any suitable vehicle is herein embodied in a wheeled truck by which a mining mechanism such as a coal cutter is carried for transporting the same from plate to place about the mine and during the mining operation. The improved cable reel is preferably embodied in means for transmitting electricity to the electric motor devices of the vehicle and has wound thereon a flexible power conductor cable 5 which, in a mining mechanism, may be connected to a trolley wire and to a ground in the main entry of a mine so that electricity may be conducted to the motor devices of the mining mechanism as it moves out of the main entry into a mine passage leading to the working face.

Now referring to the improved structure of the cable reel 2, it will be noted that the reel has a perforated, hollow hub 6 fixed to a vertical shaft 7 extending downwardly from the reel hub, as shown in Fig. 3. Attached to the reel hub are top and bottom flangelike plates 8 and 9, the former being secured to the top of the reel hub as by screws, and the latter being secured to the bottom hub flange 10 as by rivets in the manner shown, and these plates form the sides of the reel so that the conductor cable may be confined therebetween as it is wound on the reel hub. The support structure 1 includes a bottom frame 11 carrying an upright cylindrical support 12 for upper and lower bearings 13 and 14. The reel shaft 7 has slight vertical axial movement in its bearings for a purpose to be later explained. This bearing support 12 has a bottom flange 15 attached as by screws to a cross plate 16 of the bottom support frame. Journaled on a bearing sleeve supported by the bearing support 12 is a driving element herein in the form of a chain sprocket 17 driven through suitable connections including an endless driving chain 18, the latter extending within the bottom frame structure in the manner shown. The drive sprocket 17 has a hub 19 resting on a bearing washer supported by the bearing support flange. The sprocket hub 19 has adjacent its upper end a motion limiting ring 20 and is externally screw threaded at 21 for engagement with the threads of a vertically movable nut 22 to which the tub 23 of a friction clutch plate 24 is keyed and by which said friction clutch plate is supported. This friction clutch plate, when moved upwardly, is engageable with a plane bottom surface 25 on the reel hub flange 10. Pivotally mounted at 27 on a cross plate 28 is a hand lever 29 in turn pivotally connected at 30 to a brake shoe 31. This brake shoe is movable into engagement with the outer rim 32 of the friction clutch plate 24 so that at times rotation of the friction clutch plate may be frictionally resisted by the shoe.

As the vehicle with which the cable reel is associated is propelled in a direction towards the front where the outer end of the cable 5 is connected, the chain and sprocket effects drive of the reel in a direction to wind in the conductor cable, the nut 22 travelling upwardly along the screw from the position shown in Fig. 3 to that shown in Fig. 4 and moving the friction plate upwardly into contact with the bottom plane surface 25 of the reel hub flange, so that the friction plate slightly lifts the cable reel so that the weight of the latter on the friction plate maintains the friction clutch applied. The reel shaft 7 slides axially in an upward direction in its bearings when the reel is raised. Under most conditions, the clutch plate 24 and nut 22 remain stationary as a result of inertia while the screw acts on the nut to effect raising of the reel and application of the clutch, but under some conditions the nut must have its rotation frictionally resisted, and this may be accomplished by moving the brake shoe 31 into engagement with the rim 32 of the clutch plate frictionally to resist clutch plate rotation. The cable reel is shown in Fig. 4 in raised position with the clutch applied. When the drive sprocket 17 is driven in the reverse direction, and it is desired to prevent paying out of the cable, the nut, friction plate and reel move downwardly to the position shown in Fig. 3 to effect clutch release and thereafter the conductor cable 5 may be freely unwound from the reel.

Electricity may be transmitted from the conductor cable 5 through the rotating cable reel to a conductor cable 35 leading to the electric motor devices of the vehicle in the manner fully disclosed in my copending application, Ser. No. 531,912 above referred to. Arranged at the rear side of the reel and mounted on the bottom frame 11 of the support structure is a curved guard 36 for guiding the conductor cable 5 as it is extended from the reel.

In the modification shown in Figs. 6, 7 and 8, the cable reel structure is similar to that above described and the drive clutch is similarly applied and released by means of the screw and nut device. In this instance, however, the drive sprocket 17 has spaced, diametrically opposite abutment lugs 37 and 38 on its upper side, and the friction clutch plate 24 has a depending lug 39 between the lugs 37 and 38 and with which the latter are movable into alternate engagement therewith. When the parts are in the position shown in Fig. 6 and the reel drive clutch is released and the sprocket 17 starts to be driven to drive the cable reel in a direction to wind in the conductor cable, the lug 39 is, at first, in adjacency to or in contact with the lug 37. As the sprocket 17 rotates in a clockwise direction as viewed in Fig. 8, the lug 37 moves away from the lug 39 and the lug 38 moves into engagement with the lug 39 and during such movement the screw 21 is rotated and the nut 22, which remains stationary with the clutch plate 24 due to inertia, moves upwardly along the screw into the position shown in Fig. 7 to apply the clutch. When the lugs 38, 39 are in contact, the clutch plate and sprocket revolve together in unison and the reel is driven. When the sprocket 17 is driven in the reverse counter-clockwise direction as viewed in Fig. 8, the lug 38 moves away from the lug 39 and the lug 37 again moves into contact with the lug 39 and during such movement the screw is rotated to move the nut, which remains non-rotatable due to inertia, downwardly along the screw to the position shown in Fig. 6 to release the clutch and to free the reel from its drive. When the lugs 37, 39 are in contact as shown in Fig. 8 and the clutch is released, the sprocket and clutch plate revolve together in unison while the cable reel remains relatively stationary. It is accordingly evident that when the sprocket 17 is driven in one direction or the other with respect to the clutch plate the latter tends to remain relatively stationary due to inertia so that the screw rotates relative to the nut which is secured to the clutch plate, and due to such inertia the retarding brake 31 of the other embodiment is found unnecessary. Otherwise this embodiment is similar to that above described.

In the modification shown in Figs. 9 to 14 inclusive, the cable reel structure is similar to that of the modified embodiment described above. In this construction, however, the screw and nut are omitted and the hub 24' of the clutch plate 24 is mounted to slide vertically along a bushing 40 supported by the hub 17' of the drive sprocket 17. In lieu of the screw and nut, the sprocket is formed with inclined planes or cams 41, 41 engaging spaced projections 42, 42 on the hub of the clutch plate. When the sprocket is rotated, the inclined planes or cams move relative to the projections to raise or lower the clutch plate 24, and as in the modified embodiment above described, such raising or lowering of the clutch plate occurs between the points of engagement of the lug 39 with the lugs 37, 38 on the sprocket. In Fig. 9, the clutch plate is shown in elevated applied position with the projections 42 at the tops of the cam surfaces as shown in Fig. 13. Otherwise this embodiment is similar to those above described.

In both modified embodiments the lugs on the sprocket strike against the lug on the clutch plate when the clutch is either applied or released, and such striking action tends to rotate the clutch plate ahead of the sprocket, and thereafter the lugs come into abutting engagement and the parts rotate together. Such striking action tends to assure complete loading or full release of the clutch depending on the direction in which the drive sprocket 17 is driven.

From the foregoing, it is evident that when the vehicle is propelled in one direction, as for instance, in a mining mechanism, from the main entry of a mine into a mine passage leading to the working face, the clutch is automatically released and the conductor cable 5 is paid out from the reel directly by the pull of the cable. When the vehicle is propelled in the opposite direction, that is, away from the working face, the clutch is automatically applied and the conductor cable 5 is wound in by power. By the particular structure provided, when the clutch is released and the reel is disconnected from its drive, the conductor cable 5 may be freely unwound from the reel by hand. Other uses and advantages of the invention will be clearly apparent to those skilled in the art.

While there are in this application specifically described one form and two modifications which the invention may assume in practice, it will be understood that these forms of the same are shown for purposes of illustration and that the invention may be further modified and embodied in various other forms without departing from its spirit or the scope of the appended claims.

What I claim as new and desire to secure by Letters Patent is:

1. In a power transmitting means, a cable reel, a reversible driving means, clutch means coaxial with said reel including coacting clutch elements having relative axial movement, one of said clutch elements in fixed relation to said reel for rotation therewith, clutch control mechanism operated by said driving means for bringing said clutch elements into coacting engagement for automatically connecting said reel to said driving means when the latter is operated in one direction and for separating said clutch elements for automatically disconnecting said reel from said driving means when the latter is operated in a reverse direction, and stop means for positively limiting operating movement of said control mechanism and for connecting said driving means and the other clutch element for movement in unison when said clutch is applied.

2. In a power transmitting means, a cable reel, clutch means coaxial with said reel for connecting said reel to said driving means including a clutch element secured to said reel for rotation therewith and a coacting clutch element, reversible driving means, means operated by said driving means upon operation thereof in one direction for moving said coacting clutch element axially into engagement with said other clutch element automatically to effect application of said clutch means, said means being operative upon operation of said driving means in the reverse direction to move said coacting clutch element axially in the opposite direction away from said other clutch element automatically to effect release of said clutch means, and stop means associated with said moving means for positively limiting relative axial movements of said coacting clutch element relative to said driving means and for connecting said driving means and coacting clutch element for movement in unison in either position of said clutch means.

3. In a power transmitting means, a cable reel mounted for rotation about an upright axis and for limited axial movement, reversible driving means, clutch means for connecting said reel to said driving means, and means operated by said driving means upon operation thereof in one direction for raising said clutch means axially to effect application of said clutch and a lifting of the reel so that clutch application is maintained by the weight of the reel on the clutch, said means being operative upon operation of said driving means in the reverse direction to lower axially said reel and to lower further said clutch means to release said clutch means.

4. In a cable reel mechanism, a cable reel, a reversible driving element, a clutch for connecting said reel to said driving element for driving thereby and including a clutch element movable axially of said reel, means operated by said driving element upon operation thereof in one direction to effect axial movement of said clutch element for automatically applying said clutch to effect reel drive, and stop means associated with said moving means for positively limiting axial movement of said clutch element and for connecting said driving and clutch elements together when said clutch is applied.

5. In a cable reel mechanism, a cable reel, a reversible driving element, a clutch for connecting said reel to said driving element for driving thereby and including a clutch element movable axially of said reel, means operated by said driving element upon operation thereof in one direction to effect axial movement of said clutch element toward said reel for automatically applying said clutch to effect reel drive, said means upon operation of said driving element in the reverse direction effecting movement of said clutch element axially away from said reel for automatically releasing said clutch to interrupt reel drive, and stop means associated with said moving means for positively limiting axial movement of said clutch element and for connecting said elements for movement together when said clutch is either applied or released.

6. In a cable reel mechanism, a cable reel mounted for limited bodily axial movement, a reversible driving element, a clutch for connecting said reel to said driving element for driving thereby, and means operated by said driving element upon operation thereof in one direction bodily to move said reel axially and for automatically applying said clutch to effect reel drive, said means upon operation of said driving element in the reverse direction automatically releasing said clutch, said cable reel being so arranged and mounted and said clutch being so constructed that when drive of the reel is interrupted the latter may be freely rotated.

7. In a cable reel mechanism, a cable reel, a reversible driving element, a clutch for connecting said reel to said driving element for driving thereby, means operated by said driving element upon operation thereof in one direction for automatically applying said clutch to effect reel drive, said clutch applying means including clutch operating connections coaxial with said reel and extensible axially with respect thereto to effect clutch application upon operation of said driving element in said one direction, and stop means associated with said clutch applying means for positively limiting extension of said operating connections when said clutch is applied.

8. In a cable reel mechanism, a cable reel, a reversible driving element, a clutch for connecting said reel to said driving element for driving thereby, means operated by said driving element upon operation thereof in one direction for automatically applying said clutch to effect reel drive, said clutch applying means including a screw and nut operating connection coaxial with said reel and extensible axially toward said reel to effect clutch application upon operation of said driving element in said one direction, and stop means associated with said clutch applying means for positively limiting extension of said operating connections when said clutch is applied.

9. In a cable reel mechanism, a cable reel, a reversible driving element, a clutch for connecting said reel to said driving element for driving thereby, and means operated by said driving element upon operation thereof in one direction for automatically applying said clutch to effect reel drive, said clutch applying means including a rotatable element adapted to have its rotation resisted to effect application of said clutch, and operator controlled brake means for resisting rotation of said rotatable element to effect clutch application.

10. In combination, a reel mounted for rotation on an upright axis and for limited movement upwardly and downwardly, means for rotatably supporting said reel in its lower position, means for rotatably supporting said reel in a raised position including a reel supporting and driving element movable upwardly into supporting and driving contact with the reel and downwardly out of contact with said reel, and means for driving said element including means for automatically moving the same upwardly to support and drive the reel upon rotation of said element in one direction by its driving means.

11. In a cable reel mechanism, a cable reel, a reversible driving element, a clutch coaxial with said reel and including a clutch element secured to said reel for rotation therewith for connecting said reel in driven relation with said driving element, means operated by said driving element upon operation thereof in one direction for automatically applying said clutch to effect reel drive, said clutch applying means including an inclined plane mechanism embodying relatively movable parts movable to effect clutch application, and stop means for positively limiting applying movement of said operating means and for positively connecting said driving element and the driven element of said clutch for movement in unison when said clutch is applied.

12. In a cable reel mechanism, a cable reel, a reversible driving element, a clutch for connecting said reel in driven relation with said driving element, means operated by said driving element upon operation thereof in one direction for automatically applying said clutch to effect reel drive, said clutch applying means including cam means coaxial with said reel embodying relatively movable cam parts one of which is movable axially toward said reel to effect clutch application, and stop means for positively limiting operating movement of said applying means and for positively connecting said driving element and said axially movable cam part for movement in unison when said clutch is applied.

13. In a cable reel mechanism, a cable reel, and reel driving mechanism including a driving element, a friction clutch for connecting said cable reel to said driving element including a driven element, said elements having abutment lugs movable into engagement and said elements when said lugs are in engagement moving in unison, and clutch operating means operated by said driving element and effective to apply said clutch, said driving element moving relative to said driven element during application of said clutch and such relative movement of said elements bringing said lugs into abutting engagement, and said lugs when in abutting engagement limiting operating movement of said operating means.

14. In a cable reel mechanism, a cable reel, and reel driving mechanism including a reversible drive member having spaced lugs, a friction clutch for connecting said cable reel to said drive member including a driven element movable relative to said drive member, said driven element having a lug with which said spaced lugs are movable into alternate engagement depending upon the direction of movement of said drive member relative to said element, said drive member and said driven element moving together in unison when said lug on one part is in contact with a lug on the other part during either direction of said drive member, and clutch operating means operated by said drive member and effective to apply or release said clutch upon relative movement of said drive member and said driven element in one direction or the other, and said lugs when in contact limiting operating movement of said operating means in either direction.

15. In a cable reel mechanism, a cable reel, and reel driving mechanism including a reversible driving member having spaced lugs, a friction clutch for connecting said cable reel to said driving member including a driven element relative to which said driving member is movable angularly and having a lug projecting between said spaced lugs and with which said spaced lugs are alternately engageable depending upon the direction in which said driving member is operated, and means effective upon movement of said spaced lugs in one direction or the other relative to said second mentioned lug for applying or releasing said clutch, and said driving member and said driven element when one of said spaced lugs is in contact with said second mentioned lug moving together in unison, and the engagement of one of said spaced lugs with said second mentioned lug limiting the operating movement of said operating means in either the applied or released positions of said clutch.

16. In a cable reel mechanism, a cable reel, and reel driving mechanism including a driving member, a friction clutch for connecting said cable reel to said driving member including a driven element movable relative to said driving member, means actuated by said driving member and effective upon relative movement between said member and said element to move within predetermined limits for automatically applying said clutch, and stop means on said member and said element for positively effecting movement of said member and said element together in unison when said limit is reached and said clutch is applied, and said stop means limiting the effective movement of said clutch applying means when said clutch is applied.

17. In combination, a reel mounted for rotation and for limited axial movement, means for rotatably supporting said reel in one of its operating positions, means for rotatably supporting said reel when the latter is moved axially away from said first mentioned supporting means including a reel supporting and driving element movable axially of said reel in one direction into supporting and driving contact therewith and axially in the opposite direction out of contact with said reel, and means for driving said element including means for automatically moving the same axially in said one direction to support and drive the reel upon rotation of said element in one direction.

18. In a cable reel mechanism, the combination comprising a rotatable cable reel, means for mounting said reel for bodily axial movement, a driving mechanism, a clutch for connecting said reel to said driving mechanism, and a clutch operating device associated with said driving mechanism and driven thereby for bodily axially moving said reel to effect loading of said clutch.

19. In a cable reel mechanism, the combination comprising a rotatable cable reel disposed on a vertical axis, means for mounting said reel for bodily axial movement in a vertical direction, a driving mechanism, an axially movable clutch for connecting said reel to said driving mechanism, and a clutch operating device associated with said driving mechanism and driven thereby for bodily lifting said reel through said clutch to cause loading of said clutch by the weight of said reel.

LEON E. SIMMONS.

REFERENCES CITED

The following references are of record in the file of this patent:

UNITED STATES PATENTS

| Number | Name | Date |
| --- | --- | --- |
| 378,088 | Foote | Feb. 21, 1888 |
| 798,389 | Booker | Aug. 29, 1905 |
| 980,338 | Roan | Jan. 3, 1911 |
| 1,137,237 | Sessions | Apr. 27, 1915 |
| 1,323,727 | Streich | Dec. 2, 1919 |
| 1,554,819 | Haight | Sept. 22, 1925 |
| 1,611,027 | Hansen | Dec. 14, 1926 |
| 1,694,810 | Dunham | Dec. 11, 1928 |
| 1,713,712 | Philips | May 21, 1929 |
| 1,713,713 | Philips | May 21, 1929 |
| 2,028,500 | Cook et al. | Jan. 21, 1936 |
| 2,085,607 | Rockwell | June 29, 1937 |
| 2,225,185 | Sloane | Dec. 17, 1940 |

FOREIGN PATENTS

| Number | Country | Date |
| --- | --- | --- |
| 355,039 | France | Aug. 16, 1905 |
| 722,376 | France | Dec. 29, 1931 |

Certificate of Correction

Patent No. 2,515,805                                               July 18, 1950

LEON E. SIMMONS

It is hereby certified that error appears in the printed specification of the above numbered patent requiring correction as follows:

Column 3, line 25, for the word "plate" read *place*; line 68, for "tub" read *hub*; column 8, line 18, for "applying" read *operating*; line 19, for "operating" read *applying*;

and that the said Letters Patent should be read as corrected above, so that the same may conform to the record of the case in the Patent Office.

Signed and sealed this 29th day of May, A. D. 1951.

[SEAL]

THOMAS F. MURPHY,
*Assistant Commissioner of Patents.*